(12) United States Patent
Asselin

(10) Patent No.: US 12,187,443 B2
(45) Date of Patent: Jan. 7, 2025

(54) EXCESS THRUST CONTROL FOR AN AIRCRAFT

(71) Applicant: BOMBARDIER INC., Dorval (CA)

(72) Inventor: Mario Asselin, Sainte-Anne-des-Lacs (CA)

(73) Assignee: BOMBARDIER INC., Dorval (CA)

( * ) Notice: Subject to any disclaimer, the term of this patent is extended or adjusted under 35 U.S.C. 154(b) by 279 days.

(21) Appl. No.: 17/174,537

(22) Filed: Feb. 12, 2021

(65) Prior Publication Data

US 2021/0254556 A1 Aug. 19, 2021

Related U.S. Application Data

(60) Provisional application No. 62/976,394, filed on Feb. 14, 2020.

(51) Int. Cl.
*B64D 27/24* (2024.01)
*B64C 11/46* (2006.01)
(Continued)

(52) U.S. Cl.
CPC ............... *B64D 27/24* (2013.01); *B64C 11/46* (2013.01); *B64C 21/01* (2023.01); *B64D 29/04* (2013.01); *B64D 27/026* (2024.01)

(58) Field of Classification Search
CPC ......... B64C 21/00; B64C 21/01; B64C 21/02; B64C 21/06; B64D 29/04; B64D 27/02;
(Continued)

(56) References Cited

U.S. PATENT DOCUMENTS 5,114,097 A * 5/1992 Williams ............... B64D 33/02
244/45 R
5,480,110 A * 1/1996 Lobert ................... B64D 33/02
244/209
(Continued)

FOREIGN PATENT DOCUMENTS

| EP | 2581308 A2 | 4/2013 |
|---|---|---|
| EP | 3608221 A1 | 2/2020 |
| WO | 2017123699 A1 | 7/2017 |

OTHER PUBLICATIONS

Greitzer et al, N+3 Aircraft Concept Designs and Trade Studies, Final Report, vol. 1, Dec. 2010, NASA CR-2010-216794/vol. 1, USA.
(Continued)

*Primary Examiner* — Richard Green
*Assistant Examiner* — Colin Zohoori
(74) *Attorney, Agent, or Firm* — Norton Rose Fulbright Canada LLP

(57) ABSTRACT

Systems and methods for varying excess thrust of an aircraft include: a first electric fan rotatable about a first axis for directing a first air flow along a first air flow path; and a second electric fan rotatable about a second axis different from the first axis for directing a second air flow along a second air flow path fluidly isolated from the first air flow path, wherein the first electric fan and the second electric fan are disposed radially about a roll axis of the aircraft and adjacent an aft end of the aircraft, and the first electric fan and the second electric fan are configured to intake boundary layer air to form the first air flow and the second air flow.

18 Claims, 14 Drawing Sheets

(51) Int. Cl.
*B64C 21/01* (2023.01)
*B64D 27/02* (2006.01)
*B64D 29/04* (2006.01)

(58) Field of Classification Search
CPC ........ B64D 27/14; B64D 27/20; B64D 27/24; B64D 35/02–06; B64D 2033/0026; B64D 2027/026
See application file for complete search history.

(56) References Cited

U.S. PATENT DOCUMENTS

| | | | |
|---|---|---|---|
| 9,821,917 B2 | 11/2017 | Becker et al. | |
| 10,267,263 B2* | 4/2019 | Lord | B64D 33/04 |
| 2006/0054739 A1* | 3/2006 | Perez | F02K 3/04 244/55 |
| 2006/0185346 A1* | 8/2006 | Rolt | F02K 3/06 60/226.1 |
| 2014/0183296 A1* | 7/2014 | Suciu | F02K 3/077 244/54 |
| 2014/0250863 A1* | 9/2014 | Suciu | F02K 1/60 60/226.2 |
| 2014/0252161 A1* | 9/2014 | Gukeisen | B64D 35/02 60/726 |
| 2014/0367510 A1* | 12/2014 | Viala | B64D 27/24 244/62 |
| 2016/0332741 A1* | 11/2016 | Moxon | B64C 21/00 |
| 2017/0361939 A1* | 12/2017 | Negulescu | B64C 1/16 |
| 2018/0079514 A1 | 3/2018 | Ramakrishnan et al. | |
| 2018/0086436 A1* | 3/2018 | Pastouchenko | B64C 5/02 |
| 2018/0127089 A1 | 5/2018 | Welstead et al. | |
| 2018/0170560 A1 | 6/2018 | Conti et al. | |
| 2018/0339765 A1* | 11/2018 | Epstein | B64C 23/02 |
| 2018/0362171 A1* | 12/2018 | Curchod | B64D 29/06 |
| 2020/0070995 A1* | 3/2020 | Papas | F16H 1/222 |
| 2020/0331589 A1* | 10/2020 | Cummings | B64C 5/02 |

OTHER PUBLICATIONS

Uranga et al., Preliminary Experimental Assessment of the Boundary Layer Ingestion Benefit for the D8 Aircraft, 52nd Aerospace Sciences Meeting, Jan. 2014, AIAA SciTech, USA.
Drela, Development of the D8 Transport Configuration, 29th AIAA Applied Aerodynamics Conference, Paper 2011-3970, Jun. 2011, AIAA, USA.
Akaydin et al.,How CFD* and EFD complement each other in development of the D8 aircraft, ASME International Mechanical Engineer Congress and Exhibit, Phoenix, AZ, Nov. 15, 2016, https://www.slideshare.net/HDogusAkaydin/akaydind8asmeimece2016.
European Patent Office, Communication re. extended European search report for European patent application No. 21156938.9, Jun. 18, 2021.

* cited by examiner

EXCESS THRUST CONTROL FOR AN AIRCRAFT

CROSS-REFERENCE TO RELATED APPLICATION AND CLAIM OF PRIORITY

The present application claims priority from U.S. Provisional Patent Application No. 62/976,394, filed on Feb. 14, 2020, the entire contents of which are incorporated by reference herein.

FIELD

This disclosure relates generally to aircraft, and more particularly, to excess thrust control for an aircraft.

BACKGROUND

An aircraft such as a conventional fixed-wing aircraft typically includes one or more engines, such as turbofan jet engines to provide thrust. Such engines can be selected based on factors such as thrust requirements of the aircraft, weight of the engine and fuel burn rate of the engine.

SUMMARY

According to an aspect, there is provided a system for varying excess thrust of an aircraft, comprising: a first electric fan rotatable about a first axis for directing a first air flow along a first air flow path; and a second electric fan rotatable about a second axis different from the first axis for directing a second air flow along a second air flow path fluidly isolated from the first air flow path, wherein the first electric fan and the second electric fan are disposed radially about a roll axis of the aircraft and adjacent an aft end of the aircraft, and the first electric fan and the second electric fan are configured to intake boundary layer air to form the first air flow and the second air flow.

In some embodiments, the first fan and the second fan are coplanar in a single plane that is generally parallel to a transverse plane containing a pitch axis of the aircraft and a yaw axis of the aircraft.

In some embodiments, the first fan and the second fan are bilaterally symmetrical in a plane of symmetry containing the roll axis of the aircraft and a yaw axis of the aircraft.

In some embodiments, the system further comprises fairing channels surrounding the first fan to direct air towards the first air flow path and surrounding the second fan to direct air towards the second air flow path.

In some embodiments, the first electric fan and the second electric fan are driven by an electric motor.

In some embodiments, the electric motor is driven by electric energy from an electric generator of an auxiliary power unit.

In some embodiments, the system further comprises an inlet conduit in fluid communication with the auxiliary power unit to direct air to the auxiliary power unit.

In some embodiments, the electric motor is driven by electric energy supplied by a battery.

In some embodiments, the electric motor is operable as a generator to convert mechanical energy into electric energy to supply to the battery.

In some embodiments, the electric motor is driven by electric energy from an electric generator of one or more engines of the aircraft.

In some embodiments, the system further comprises a controller to control the electric motor.

In some embodiments, the first electric fan and the second electric fan are ducted fans.

In some embodiments, the first axis and the second axis are generally parallel to the roll axis of the aircraft.

In some embodiments, the first electric fan and the second electric fan are fully disposed within a distance from the surface of the aircraft that is less than a boundary layer thickness formed from the surface of the aircraft during take-off and cruising of the aircraft, the boundary layer thickness a distance from the surface to a point at which a velocity of a local flow is ninety-nine percent of a velocity of a surrounding freestream flow.

In some embodiments, the first electric fan and the second electric fan are disposed adjacent a tail cone of the aircraft.

In some embodiments, the system further comprises: a first gate actuable between a closed position, to direct a forward flow of the first air flow in the first flow path from a forward end of the aircraft to the aft end of the aircraft, and an open position, to direct a reverse flow of the first air flow in the first flow path from the aft end of the aircraft to the forward end of the aircraft; and a second gate actuable between a closed position, to direct a forward flow of the second air flow in the second flow path from a second end of the aircraft to the aft end of the aircraft, and an open position, to direct a reverse flow of the second air flow in the second flow path from the aft end of the aircraft to the forward end of the aircraft.

In some embodiments, the system further comprises: a third electric fan rotatable about a third axis for directing a third air flow along a third air flow path; a fourth electric fan rotatable about a fourth axis for directing a fourth air flow along a fourth air flow path; a fifth electric fan rotatable about a fifth axis for directing a fifth air flow along a fifth air flow path; and a sixth electric fan rotatable about a sixth axis for directing a sixth air flow along a sixth air flow path, wherein the third electric fan, the fourth electric fan, the fifth electric fan, and the sixth electric fan are disposed radially about the roll axis of the aircraft and adjacent the aft end of the aircraft and configured to intake boundary layer air to form the third air flow, the fourth air flow, the fifth air flow and the sixth air flow, each of the first axis, the second axis, the third axis, the fourth axis, the fifth axis, and the sixth axis are different from each other, and each of the first air flow path, the second air flow path, the third air flow path, the fourth air flow path, the fifth air flow path, and the sixth air flow path are fluidly isolated from each other.

According to another aspect, there is provided an aircraft comprising a first engine, a second engine and a system as described herein.

In some embodiments, the system is configured to generate forward takeoff thrust to supplement thrust generated by the first engine and the second engine during takeoff of the aircraft.

In some embodiments, system is configured to generate forward cruise thrust to supplement thrust generated by the first engine and the second engine during cruise of the aircraft.

Other features will become apparent from the drawings in conjunction with the following description.

BRIEF DESCRIPTION OF DRAWINGS

In the figures which illustrate example embodiments.

DETAILED DESCRIPTION

Figure 1:
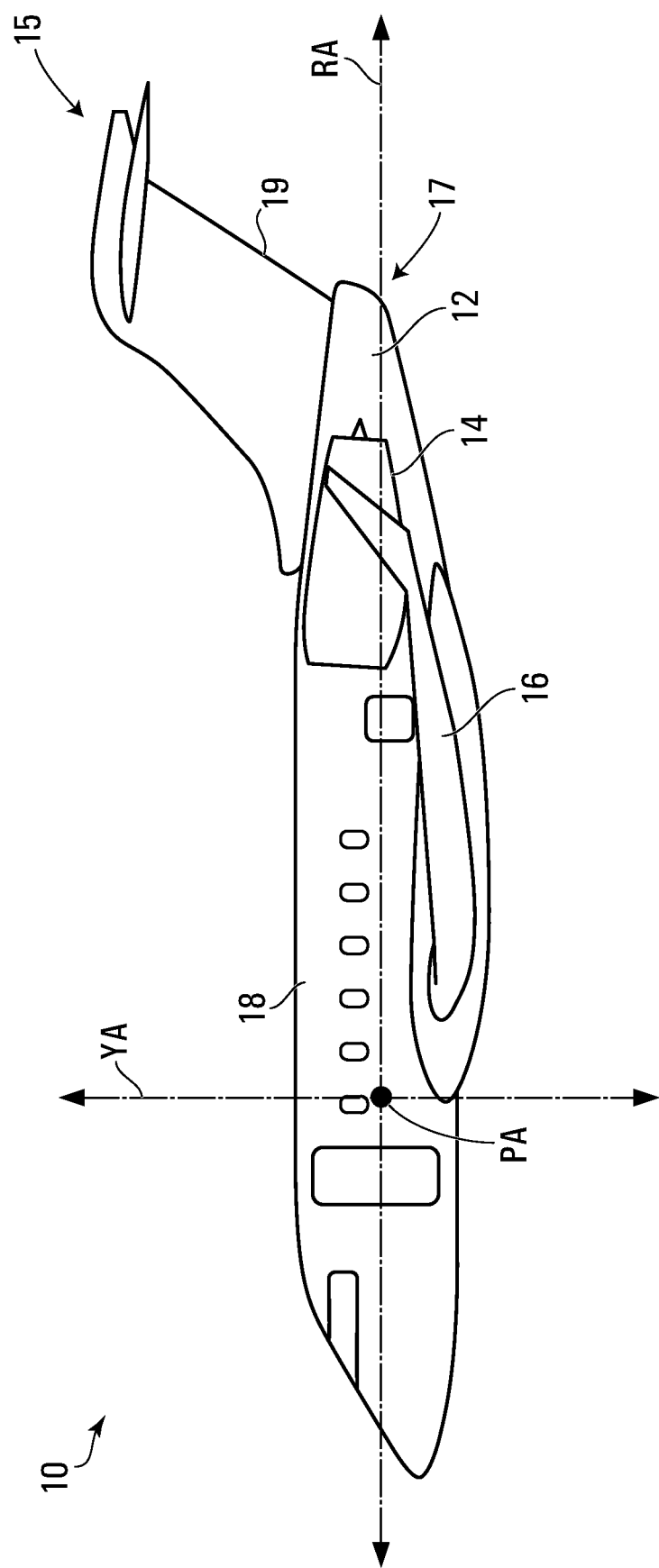
FIG. 1 is a side view of an aircraft having a system for varying excess thrust, in accordance with an embodiment.

The design of a new aircraft, or upgrade of an existing aircraft, can involve the selection of engines for traditional propulsion. Engines can be selected based on the operating requirements of the aircraft and to optimize the factors such as thrust requirements of the aircraft, weight of the engine, fuel burn rate of the engine, and cost.

However, in practice, engines are selected on the basis of the types of engines that exist or are available from engine manufacturers for a particular size of aircraft. Certain factors may not be optimized. For example, often the engine selected is too big for most needs of the aircraft, but necessary to meet certain thrust requirements of the aircraft, such as static takeoff thrust. Thus, a non-optimal engine is used, which may have to be de-rated (to limit power) to produce less thrust, and as a larger engine, weighs more. A larger engine can further require additional structure to support the engine on an aircraft.

Thus, traditional design using existing minimum thrust-compliant engines can result in an engine that is overweight, which has a compounding effect on the design of the aircraft.

Systems and methods for varying excess thrust of an aircraft and thereby controlling excess thrust, as described herein, can provide flexibility in engine selection for an aircraft.

Excess thrust of an aircraft can be represented as a vector quantity having magnitude and direction, and can be defined as the vector difference between the thrust vector T minus drag vector D of the aircraft.

During operation of an aircraft, excess thrust can be varied to modify climb and descent of the aircraft, and control of the flight path.

Systems and methods described herein can generate forward thrust, allowing for selection of engines for an aircraft that are smaller and lighter, or provide less takeoff thrust, but offer optimum weight and fuel burn by supplementing engine thrust with additional forward thrust. Thus, smaller engines that have reduced weight and volume can be used, reducing cost.

Conveniently, a smaller engine can also allow for the use of a smaller vertical stabilizer or vertical tail, also reducing cost and weight. A reduced rudder height, which can be attach at the same attachment points on a vertical tail, can further reduce cost and weight.

Thus, an aircraft can have a reduced operating empty weight (OEW) and improved mission fuel burn.

In addition, forward thrust generated by systems described herein can also provide climb capability if an aircraft engine fails.

Systems and methods described herein can also generate reverse thrust to act against the forward travel of the aircraft, providing deceleration or reverse travel. In an example, at high altitude and descent, reverse thrust can be applied to descend without using engines and deploying speed brakes.

Forward or reverse thrust can be applied along a centerline of an aircraft.

Systems and methods described herein can also control drag caused by the interaction and contact of an aircraft as it moves through fluid such as air. In particular, a system can increase or decrease drag, sometimes referred to as profile drag, defined as the sum of pressure drag (form drag) and skin friction (skin drag).

Pressure drag is caused by increased pressure on the front and decreased pressure on the rear of an aircraft moving through air. Skin friction is caused by the interaction between molecules of the air and the solid surface of the aircraft.

During movement of an aircraft, a boundary layer is formed in the immediate vicinity of the aircraft surface where the effects of viscosity are significant. The collision of molecules near the surface of the aircraft creates a thin layer (boundary layer) of fluid near the surface in which the velocity changes from zero at the surface to the free stream ("clean" air flow) value away from the surface. Boundary layers can include laminar flow (layered) or turbulent flow (disordered).

The boundary layer adds to the effective thickness of the aircraft body, through the displacement thickness, hence increasing the pressure drag. Secondly, the shear forces at the surface of the aircraft create skin friction drag.

Systems and methods described herein can reduce drag by ingesting boundary layer air that is slower moving, and redirecting and accelerating it, for example, to the same speed as the aircraft, as well as reducing pressure differential between front and rear surfaces of the aircraft.

In an example, drag can be increased at high altitude and descent, to descend without using engines and deploying speed brakes.

FIG. 1 is a side view of an aircraft 10 which can include a system 12 for varying excess thrust of aircraft 10, as described herein. Aircraft 10 can be a fixed-wing aircraft comprising one or more engines 14. Aircraft 10 can comprise wings 16, fuselage 18 and empennage 15 including a tail cone 17 and a vertical stabilizer or vertical tail 19. Aircraft 10 can be any type of aircraft such as corporate, private, commercial and passenger aircraft suitable for civil aviation. For example, aircraft 10 can be a (e.g., ultra-long range) business jet, a twin-engine turboprop airliner or a regional jet airliner.

Aircraft 10 is rotatable about three axes: a yaw axis YA extending vertically (up and down) about which aircraft 10 noses left or right; a pitch axis PA extending from wing to wing (side-to-side) about which aircraft 10 noses up or down; and a roll axis RA extending from nose to tail (front-to-rear) about which aircraft 10 rotates.

Aircraft 10 can include an auxiliary power unit (APU) 11 (sometimes called "auxiliary power system"), including a gas turbine engine to supply electric and pneumatic power to aircraft systems as an auxiliary or secondary source of power.

Figure 2:
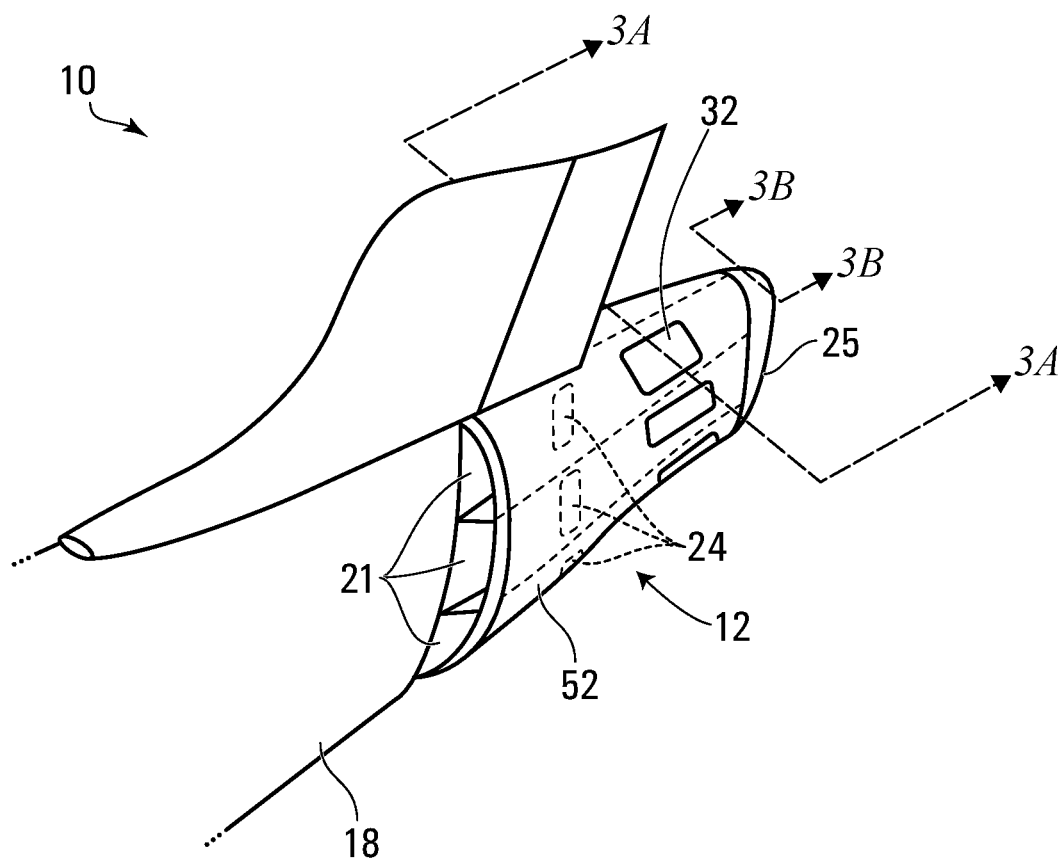
FIG. 2 is a partial perspective view of the aircraft, including the system, of FIG. 1, in accordance with an embodiment.

FIG. 2 is a partial perspective view of aircraft 10, including system 12, in accordance with an embodiment, disposed in tail cone 17 of the empennage 15 region of aircraft 10. System 12 is operable, among other things, to draw a forward flow 402 of air from an environment, such as a boundary layer, through one or more inlets 21 along a flow channel 22 and exit at one or more outlets 25, which can be defined by a duct or conduit 23 formed, for example, of fairings or casings, for generating thrust.

System 12 can include a fan 24, such as an electric fan which can be driven by a motor such as an electric motor 40. In some embodiments, fan 24 is a ducted fan.

In some embodiments, fan 24 includes one or more rotors 242 such as an impeller and can include rotor blades or airfoils fixed on a spindle to impel air. The impeller can be used to increase or decrease pressure and flow of a fluid. In some embodiments, an impeller can be a radial flow impeller (flow enters axially and leaves radially) or an axial flow impeller (flow enters axially and leaves axially).

In some embodiments, fan 24 includes one or more stators 244 having stator blades or circumferentially spaced apart struts. Once air is impelled by the rotor blades, it can pass through stator blades. The stator blades are fixed, for example, to flow channel 22, and act as diffusers to partially convert high velocity air into high pressure. Each rotor 242 and stator 244 pair can form a compressor stage.

Fan 24 can be powered by a power source to add energy to a moving fluid (such as air, and in particular, boundary layer air of aircraft 10) by converting electrical energy to mechanical energy (such as by way of electric motor 40) to rotate an impeller or blades of fan 24 to impel air, accelerating the airflow to generate thrust for aircraft 10.

In some embodiments, fan 24 is disposed adjacent roll axis RA. In an example, a single fan 24 can be located along roll axis RA.

In some embodiments, fan 24 is rotatable about an axis that is generally parallel to a centerline (such as roll axis RA). In some embodiments, fan 24 rotates about an axis that is canted or at an angle to a centerline (such as roll axis RA).

In an example, fan 24 is rotatable in a first direction to impel air towards the rear of aircraft 10, and rotatable in a second direction, opposite the first direction, to impel air towards the front of aircraft 10.

Fan 24 can also operate as a turbine to extract energy from a moving fluid (such as air, in particular, in a boundary layer of aircraft 10).

Fan 24 can extract energy by converting mechanical energy of the moving fluid (air) rotating blades of fan 24 to electrical energy, for example, by way of electric motor 40 operating as a generator, as described in further detail below, and such electrical energy can be stored, for example, in a battery or for use by an electrical system of aircraft 10.

In some embodiments, system 12 can include multiple fans 24, including a first electric fan and a second electric fan, which can to provide flexibility and avoid a single point of failure. In some embodiments, system 12 includes six fans 24, namely, a further third electric fan, fourth electric fan, fifth electric fan, and sixth electric fan. In other embodiments, system 12 can include other suitable numbers and configurations of fans 24.

Each fan 24 can rotate about one or more same or different axes. In some embodiments, a first electric fan 24 is rotatable about a first axis for directing a first air flow along a first air flow path, defined by a flow channel 22 as described below, and a second electric fan 24 is rotatable about a second axis different from the first axis for directing a second air flow along a second air flow path, defined by another flow channel 22 as described below, fluidly isolated from the first air flow path. The first axis and the second axis can be generally parallel to roll axis RA of aircraft 10.

One or more fans 24 can be disposed radially about roll axis RA of aircraft 10 and adjacent an aft end of the aircraft 10, such as adjacent tail cone 17. In some embodiments, one or more fans 24 fan are configured to intake boundary layer air to form the air flow, as described in further detail below.

One or more fans 24 can be operated as symmetrical pairs, which can balance the application of thrust or modification of drag about aircraft 10.

Figure 3A:
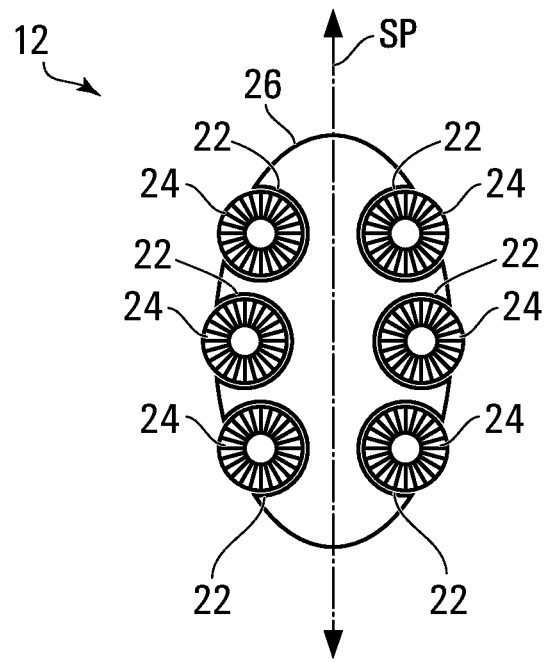
FIG. 3A is a cross-section view taken along lines 3A-3A of the system of FIG. 2.

FIG. 3A is a cross-sectional view taken along lines 3A-3A of system 12, illustrating an embodiment having six fans 24.

In some embodiments, one or more fans 24 can intersect a generally vertical plane, or be offset or canted from vertical, for example, in alignment with an aft spar in tail cone 17 of aircraft 10.

In some embodiments, one or more fans 24 are coplanar in a single plane that is generally parallel to a transverse plane containing pitch axis PA of aircraft 10 and yaw axis YA of aircraft 10.

One or more fans 24 can be spaced to accommodate cooling between fans 24.

In some embodiments, one or more fans 24 of system 12 can be reflectionally symmetrical or bilaterally symmetrical in a plane of symmetry, such as plane SP shown in FIG. 3A, containing roll axis RA and yaw axis YA of aircraft 10.

In some embodiments, fairing 26 (forming fairing channels) or other structural features can surround fans 24, to direct air towards an air flow path for each fan 24, forming separate and independent flow channels 22 that are fluidly isolated and each fan 24 can be fluidly isolated from each other. Conveniently, isolating flow channels 22 can allow for less interference with other flow channels 22 if a fan 24 or other component of flow channel 22 fails. An example flow channel 22 is shown in further detail in FIGS. 4A and 4B.

In some embodiments, multiple flow channels 22 can direct flow to a single fan 24.

Other suitable fan configurations are contemplated to accommodate thrust for supplementing engines 14 of aircraft 10.

System 12, in particular, components of said system such as fans 24, can be covered by a skin surface 52 formed of a suitable material such as aluminum, aluminum alloy, or composite materials.

In some embodiments, skin surface 52 surrounding fans 24 can have a diameter larger than the skin of a traditional tail cone 17.

Skin surface 52 can be radially outward of the trajectory of fuselage 18 skin to allow inlets 21 to conduit (intake or outtake) air.

Figure 3B:
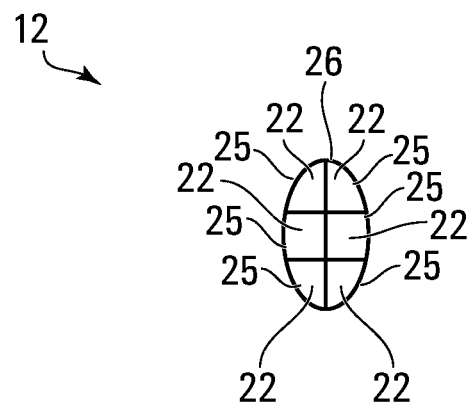
FIG. 3B is a cross-section view taken along lines 3B-3B of the system of FIG. 2.

At a distal end of flow channel 20, opposite inlets 21, outlets 25 conduit (intake or outtake) flow to the environment. Forward flow 402 can be directed to an exhaust stream to exit at a rear of aircraft 10 by way of one or more exhaust outlets 25. Outlets 25 can be separate and independent for each flow channel 22, for example, separated by fairings, as shown in FIG. 3B. FIG. 3B is a cross-sectional view taken along lines 3B-3B of system 12, illustrating exhaust outlets 25 for each flow channel 22.

In some embodiments, system 12 includes an actuable gate such as a reverse flow door 32 as part of a flow direction system 30 for each fan 24, as described in further detail with reference to FIGS. 4A and 4B, below.

Figure 4A:
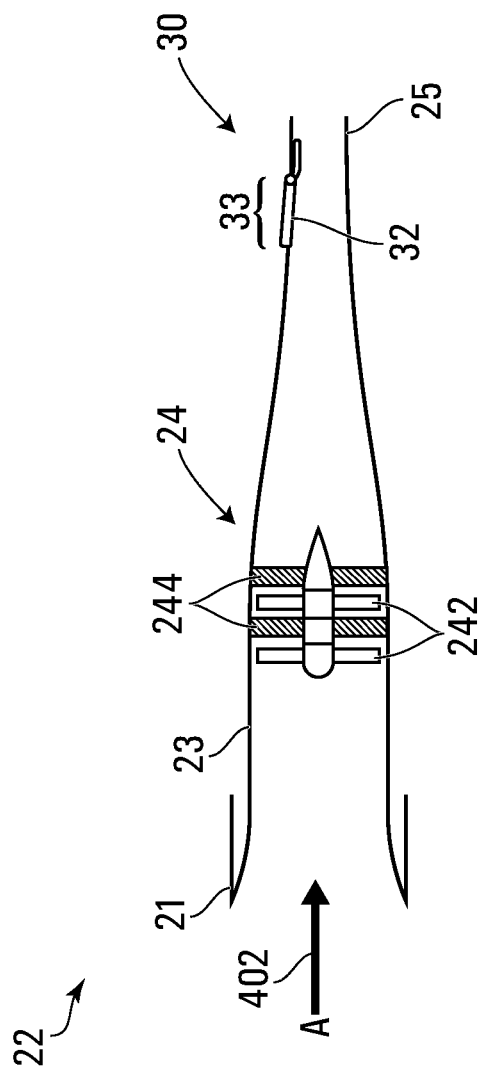
FIG. 4A is a schematic side view of a system for varying excess thrust, including a flow direction system in a closed position, in accordance with an embodiment.

FIG. 4A is a schematic side view of forward flow 402 drawn in direction A through a flow channel 22 of system 12, with reverse flow door 32 in a closed position, in accordance with an embodiment. FIG. 4B is a schematic side view of reverse flow 404 of flow channel 22 with reverse flow door 32 in an open position, in accordance with an embodiment. Each of multiple fans 24 of system 12 can be disposed in a separate flow channel 22 as described herein.

Forward flow 402 can be accelerated by fan 24 rotating in the first direction to impel air towards outlet 25 the rear of aircraft 10. The acceleration of forward flow 402 generates forward thrust applied to aircraft 10.

Reverse flow 404 can be accelerated by fan 24 rotating in the second direction to impel air towards inlet 21 and the front of aircraft 10. The acceleration of reverse flow 404 generates reverse thrust applied to aircraft 10.

Figure 4B:
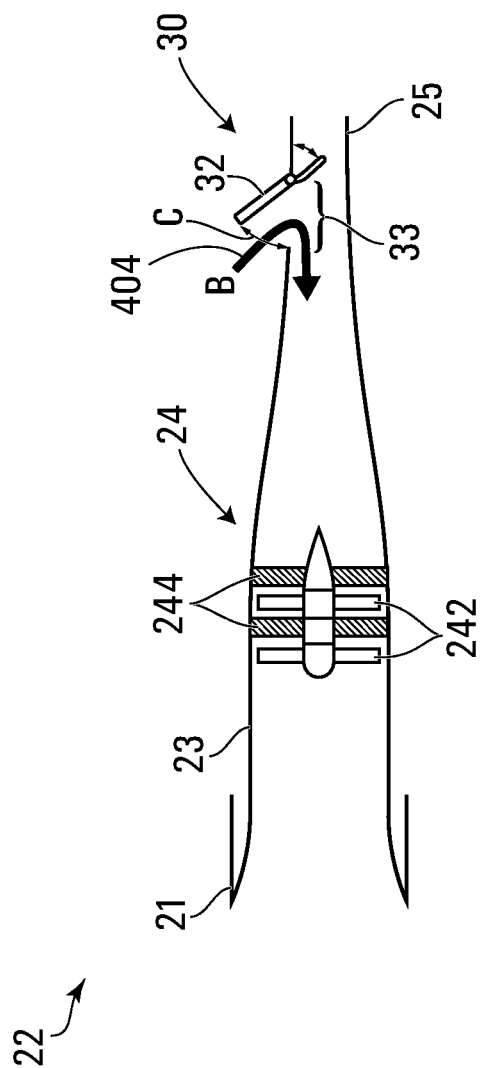
FIG. 4B is a schematic side view of the system with the flow direction system of FIG. 4A in an open position.

As shown in FIGS. 4A and 4B, a fan 24 can have multiple rotors 242 and stators 244.

Flow direction system 30 includes a reverse flow door 32 that is rotatably attached to conduit 23 and actuable, for example, rotatable using a suitable actuator, between a closed position as shown in FIG. 4A and an open position as shown in FIG. 4B.

In some embodiments, reverse flow door 32 can operate in a position-based detection of direction of rotation of fan 24, for example, a rotor 242 of fan 24. For example, reverse flow door 32 can operate in a closed position, for example, as shown in FIG. 4A, when fan 24 rotates in a direction to direct air flow in direction A, as shown in FIG. 4A. Reverse flow door 32 can operate in an open position, for example, as shown in FIG. 4B, when fan 24 rotates in an opposite direction to direct air flow in direction B, as shown in FIG. 4B.

In some embodiments, the direction of rotation of fan 24 is detected by a controller to selectively actuate reverse flow door 32 between an open and closed position.

In a closed position, as shown in FIG. 4A, reverse flow door 32 covers, and in some embodiments, seals, opening 33 in conduit 23 to direct forward flow 402 in a flow path from a forward end of aircraft 10, such as inlet 21 to an aft end of aircraft 10, such as outlet 25.

In some embodiments, reverse flow door 32 is rotatable, for example, in direction C shown in FIG. 4B, to an open position to direct reverse flow 404 in a flow path in direction B through flow channel 22 from an aft end of aircraft 10, such as opening 33 to a forward end of aircraft 10, such as inlet 21.

Instead of drawing air from an exhaust plane formed by outlets 25, door 32 can provide a pathway through opening 33 for air flow to enter flow channel 22 to generate a reverse flow 404, and therefore can allow for generation of further reverse thrust.

Reverse flow doors 32 can also prevent backflow between flow channels 22, that could affect flow speed and direction, by allowing any overpressure or underpressure to be vented to outside air.

In some embodiments, exhaust of forward flow 402 for each fan 24 can exhaust to a common outlet or exit.

In some embodiments, exhaust of reverse flow 404 for each fan 24 can exhaust to a common outlet or exit.

Figure 4C:
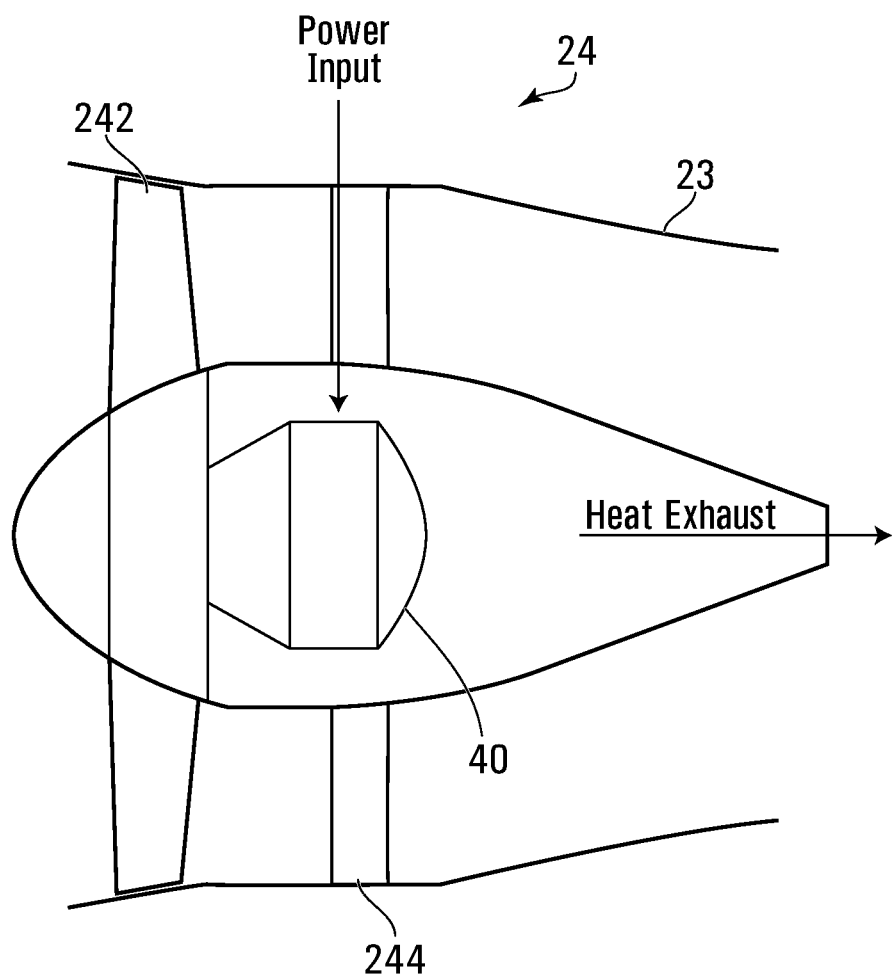
FIG. 4C is a schematic side view of a fan and a motor of a system for varying excess thrust, in accordance with an embodiment.

FIG. 4C is a schematic side view of fan 24, including a rotor 242 and a stator 244, rotatably coupled and drive by an electric motor 40, in accordance with an embodiment.

As shown in FIG. 4C, a power input can be supplied to electric motor 40 to drive electric motor 40 and in turn rotate fan 24. Generated heat can be exhausted to exit flow channel 22, for example, by way of outlet 25.

Figure 5:
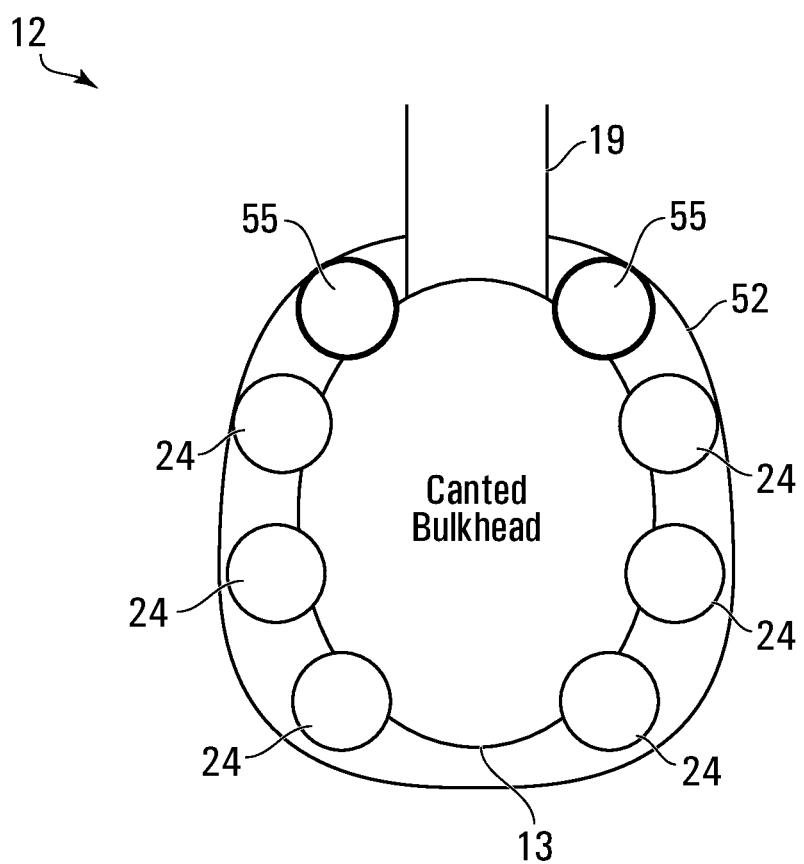
FIG. 5 is a front schematic view of a system for varying excess thrust, in accordance with an embodiment.

FIG. 5 is a partial front schematic view of system 12, in accordance with an embodiment. As shown in FIG. 5, system 12 can include an arrangement of six electrically-powered fans 24 disposed in a cavity in a tail cone 17 within aircraft 10, for example, around a canted bulkhead 13.

Canted bulkhead 13 can be a reinforced structure within tail cone 17, to which components (such as fans 24) can be affixed. Canted bulkhead 13 can further act as a fire barrier, for example, for an auxiliary power unit such as APU 11.

In some embodiments, system 12, including components such as fans 24, forms a self-contained unit within tail cone 17.

In some embodiments, components of system 12 such as fans 24 are disposed adjacent a rear or aft spar of aircraft 10. In some embodiments, fans 24 can be arranged to intersect with a plane formed by an aft spar of vertical tail 19 that can serve as a fire wall for APU 11.

In some embodiments, fans 24 can be disposed rearward of aft spar, for example, in a cavity.

FIG. 5 also illustrates APU inlet conduits 55 in fluid communication with an auxiliary power unit such as APU 11 that intake air to direct air to the auxiliary power unit.

Fans 24 and APU inlet conduits 55 can be separated by fairing, such that each is fluidly isolated.

In some embodiments, components of system 12, in particular, fans 24 are disposed rear of pylons of aircraft 10.

In some embodiments, a fuel tank in tail cone 17 of aircraft 10 can be displaced or removed to provide space to dispose fans 24 closer to a centerline of aircraft 10, thus resulting in a smaller diameter of skin surface 52. In some embodiments, aircraft 10 does not require excess fuel from such a fuel tank due to better fuel efficiency achieved by system 12.

System 12 can also include one or more electric motors 40. In some embodiments, one or more fans 24 are electrically powered and can be rotatably coupled and driven by one or more electric motors 40.

In some embodiments, electric motor 40 is an AC motor, for example, an induction motor or an asynchronous motor, driven from an AC current source, such as three-phase, 400 Hz AC current produced by an electric generator.

In some embodiments, electric motor 40 is a DC motor, driven by a DC current source, such as DC current supplied by a generator, or supplied by, for example, a battery, accumulator, or external power source, such as a ground power unit, or DC current supplied by a suitable rectifier, such as a transformer rectifier unit, to convert AC current generated by a generator to DC, for example, 28 V DC current.

Electric motor 40 can be integral with one or more fans 24, and can be connected to one or more fans 24 by a shaft connection (not shown).

A fan 24 can include multiple sets of rotors and stators, or multiple rows of fan blades. Torque available from an energy source (such as motor 40) is consumed by fan 24. A particular fan shape and size can be designed to operate at a maximum torque at a given RPM, and at a high RPM, fan 24 can stall and loses efficiency. Thus, a number of rows of fan blades can be selected dependent on a mix of fan blade size, number of fan blades, RPM of fan rotation, and torque input.

In some embodiments, electric motor 40 can be operated as an electric generator to generate electricity by transferring power from the rotation of fan 24 to electric power by electromagnetic induction. Such electric power can be stored, in some embodiments, in a battery or other suitable storage device.

One or more fans 24 can be driven by a single electric motor 40. In some embodiments, each fan 24 can be driven by a separate individual electric motor 40. In other embodiments, a pair of fans 24 can be driven by a single electric motor 40.

Other suitable mechanism for powering fans 24 are contemplated, for example, a heat engine such as an internal combustion engine.

System 12 can also include one or more controllers 50, which can be implemented in hardware and/or software, to monitor and control power, RPM, direction of rotation of fan 24.

In some embodiments, one or more controllers 50 can be used to control electric motor 40, such as input power to electric motor 40, and thus output torque from electric motor 40. A controller 50 can thus control the direction and speed of rotation of fans 24 and thus the amount of thrust generated for forward or reverse thrust. Each of multiple fans 24 can be operated independently and individually controlled. For example, certain fans 24 can act to generate thrust, and certain fans 24 can operate as generators.

In an example, fan(s) 24 adjacent a top portion of aircraft 10 can have more influence on the flow of air around the vertical tail, and thus can be adjusted based on flight parameters, as compared to fan(s) 24 adjacent a lower portion of aircraft 10 that can have less impact on the flow of air and can be further disposed in clean air and be a better source for regeneration. Thus, for the purposes of regeneration, lower fan(s) 24 can be activated and for the purposes of modifying flight thrust, upper fan(s) 24 can be activated.

In some embodiments, one or more controllers 50 can be the same or different and control any one or more of electric motors 40.

Figure 6:
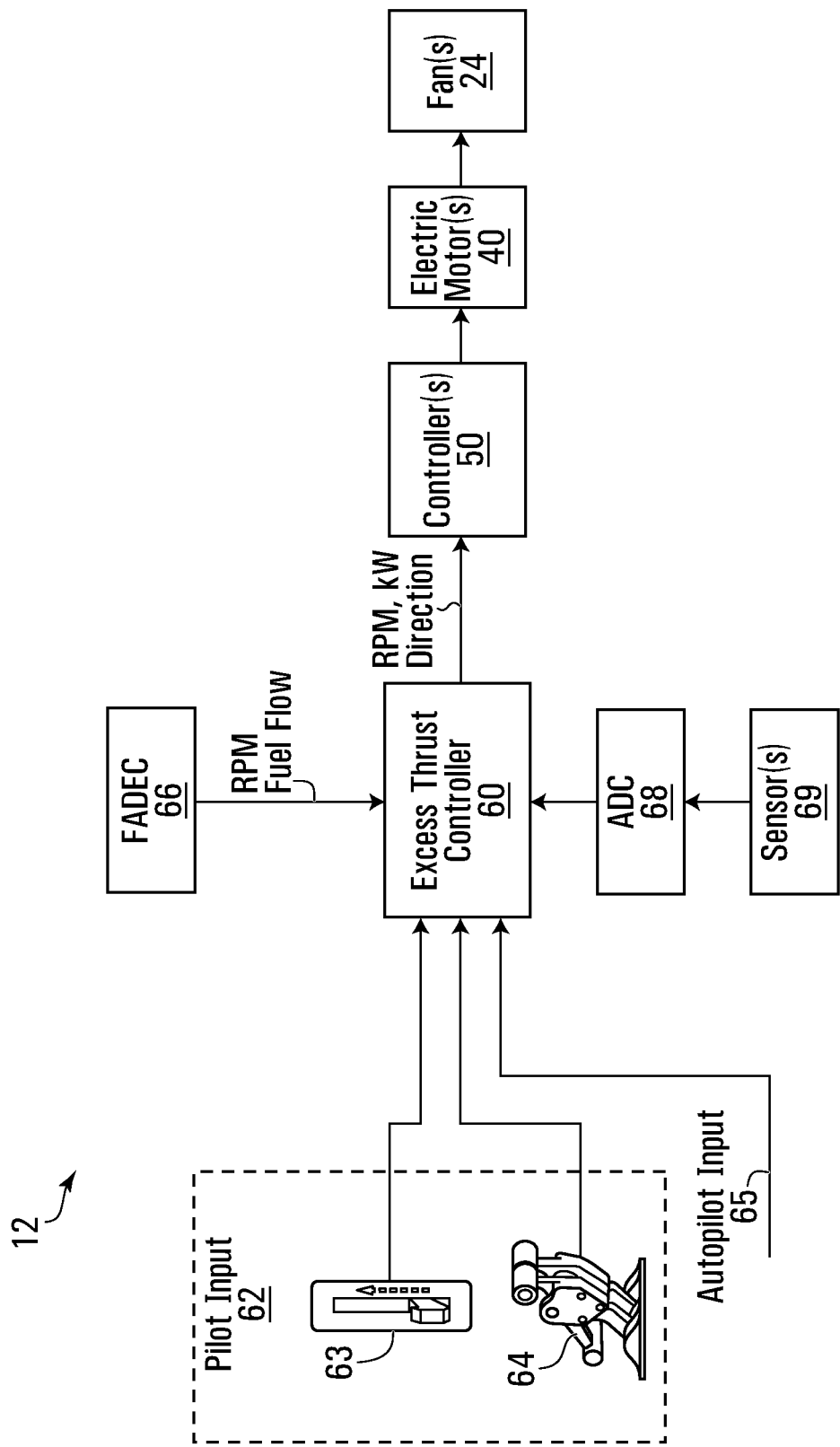
FIG. 6 is a schematic diagram of a system for varying excess thrust including a centralized controller, in accordance with an embodiment.

System 12 can also include a centralized controller such as excess thrust controller 60, as shown in FIG. 6. Excess thrust controller 60 can provide logic for operation of system 12. In some embodiments, excess thrust controller 60 and controller(s) 50 can be implemented as an integrated system. In other embodiments, excess thrust controller 60 and controller(s) 50 can be implemented separately and independently, and in communication with each other.

Excess thrust controller 60 can be implemented as a computing device or a computer. The computer can comprise one or more data processors (referred hereinafter in the singular) and one or more computer-readable memories (referred hereinafter in the singular) storing machine-readable instructions executable by data processor and configured to cause data processor to generate one or more outputs (e.g., signals) for causing the execution of steps of the methods described herein.

The computer can be part of an avionics suite of aircraft 10. For example, in some embodiments, the computing device can carry out additional functions than those described herein. In various embodiments, the computer can comprise more than one computer or data processor where the methods disclosed herein (or part(s) thereof) could be performed using a plurality of computers or data processors, or, alternatively, be performed entirely using a single computer or data processor.

The data processor can comprise any suitable device(s) configured to cause a series of steps to be performed by the computer so as to implement a computer-implemented process such that instructions, when executed by the computer or other programmable apparatus, can cause the functions/acts specified in the methods described herein to be executed.

Memory can comprise any suitable machine-readable storage medium. Memory can comprise non-transitory computer readable storage medium such as, for example, but not limited to, an electronic, magnetic, optical, electromagnetic, infrared, or semiconductor system, apparatus, or device, or any suitable combination of the foregoing. Memory can include a suitable combination of any type of computer memory that is located either internally or externally to the computer. Memory can comprise any storage means (e.g. devices) suitable for retrievably storing machine-readable instructions executable by data processor.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) (e.g., memory) having computer readable program code (e.g., instructions) embodied thereon. Computer program code for carrying out operations for aspects of the present disclosure in accordance with instructions can be written in any combination of one or more programming languages. Such program code can be executed entirely or in part by the computer or other data processing device(s). It is understood that, based on the present disclosure, one skilled in the relevant arts could readily write computer program code for implementing the methods disclosed herein.

As illustrated in FIG. 6, in some embodiments, excess thrust controller 60 can be operatively connected and in communication with pilot input 62, autopilot input 64, full authority digital engine control (FADEC) 66, an air data computer (ADC) 68 that digitizes signals received from sensor(s) 69, and one or more controllers 50 for operating one or more motors 40 for driving one or more fans 24. In some embodiments, excess thrust controller 60 is operative connected and in communication with reverse flow door(s) 32 (not shown) for control and sensing of reverse flow door(s) 32.

Pilot input 62 includes input from a pilot to flight controls, for example, spoilers 63 for controlling drag and lift component of spoilers on aircraft 10, speed brake levels (not shown) for controlling drag produced by speed brakes, and throttles 64 such as a throttle quadrant including control such as levers for forward and reverse thrust.

Autopilot input 65 can include flight mode, and airspeed and altitude information which can be input to excess thrust controller 60.

FADEC 66 is a computing device configured to control engine performance and is in communication with excess thrust controller 60 send information relating to RPM and fuel flow of engines 14 to excess thrust controller 60.

One or more suitable sensor(s) 69 measure real-time data associated with the operation of aircraft 10 and received as input, for example, flight conditions such as airspeed and altitude, temperature, flight path, and air or ground mode.

Sensor input can be received and processed by ADC 68 that is in communication with excess thrust controller 60 to transmit flight condition information to excess thrust controller 60.

Based on received data, such as information related to pilot input from pilot input 62, autopilot input from autopilot input 65, engine control information from FADEC 66 and flight condition information from ADC 68, excess thrust controller 60 can determine what mix of forward or reverse thrust/drag to be generated by system 12.

Based on determined forward or reverse thrust/drag, excess thrust controller 60 can sends controller(s) 50 suitable RPM, kW and direction signals to control each electric motor(s) 40, and thus each fan(s) 24, accordingly.

In some embodiments, aircraft 10 operates under pilot control, and flight path angle and airplane acceleration can be controlled, in part, by system 12.

In some embodiments, aircraft 10 operates in a cruise mode with autopilot on, and excess thrust controller 60 can determine whether operating fans 24 can result in an overall fuel burn reduction, and can vary operation of system 12 such as the amount of power sent to system 12 to vary the amount of thrust generated based on monitored fuel consumption levels.

In some embodiments, excess thrust controller 60 monitors fuel burn in real time to vary operation of system 12 to optimize fuel burn and minimize energy consumption.

Excess thrust controller 60 can thus determine if fuel burn reduction can be achieved by running fans 24 of system 12 using energy from engines 14 to result in an overall gain of fuel consumption.

In some embodiments, system 12 can be controlled by actuation of a throttle lever, such as throttle 64, of aircraft 10. Excess thrust controller 60 can determine whether to activate system 12, and whether to increase or decrease thrust as required.

In an example, should an engine 14 fail, excess thrust controller 60 can increase the forward thrust generated by system 12.

In another example, if a speed brake lever is activated, excess thrust controller 60 can operate to reduce the thrust generated by fans 24 and increase drag.

In some embodiments, excess thrust controller 60 can be configured to select an appropriate power source to drive fans 24, for example, based on the amount of thrust desired to be generated. Excess thrust controller 60 can also be configured to operate system 12 in a regeneration mode to capture power, in the event that increased drag or less thrust is desired.

Power source for supply to system 12 can include power to operate one or more controllers 50 and/or one or more electric motors 40 to drive fans 24. A power source can include one or more of an electric generator, such as generator 50, powered by a gas turbine engine such as one or more of engines 14 or an APU.

In some embodiments, it is possible to switch between power sources for system 12.

A power source can be selected, for example, by excess thrust controller 60, based on the use or operational mode of system 12, as discussed in further detail below.

In some embodiments, an aircraft 10 with system 12 can include an APU such as APU 11 to provide power fans 24 of system 12, for example, for takeoff and go-around.

In an example, a larger APU than would be typically provided can be utilized to provide up to 800 shp (shaft horsepower) to system 12, in particular, for takeoff and go-around.

While typically one air intake can be sufficient for an APU that solely generates electricity for pneumatics and electrical systems for aircraft 10, with a larger APU, it can be necessary to include a second intake to provide additional air to the APU. Two such inlets are illustrated by way of example as APU inlets 55 in FIG. 5.

Figure 7:
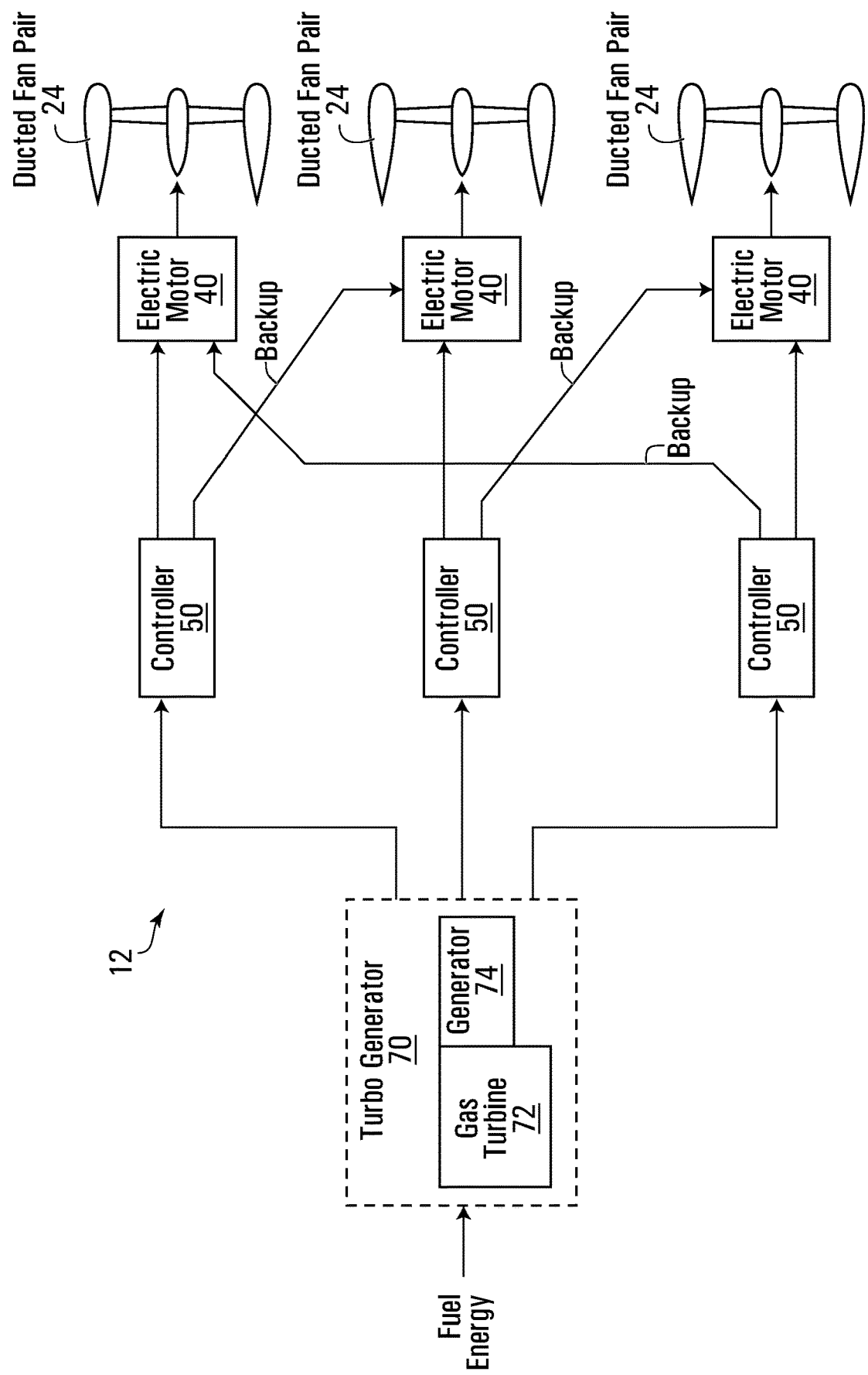
FIG. 7 is a schematic diagram of an operating environment of a system for varying excess thrust, in accordance with an embodiment.
Figure 8:
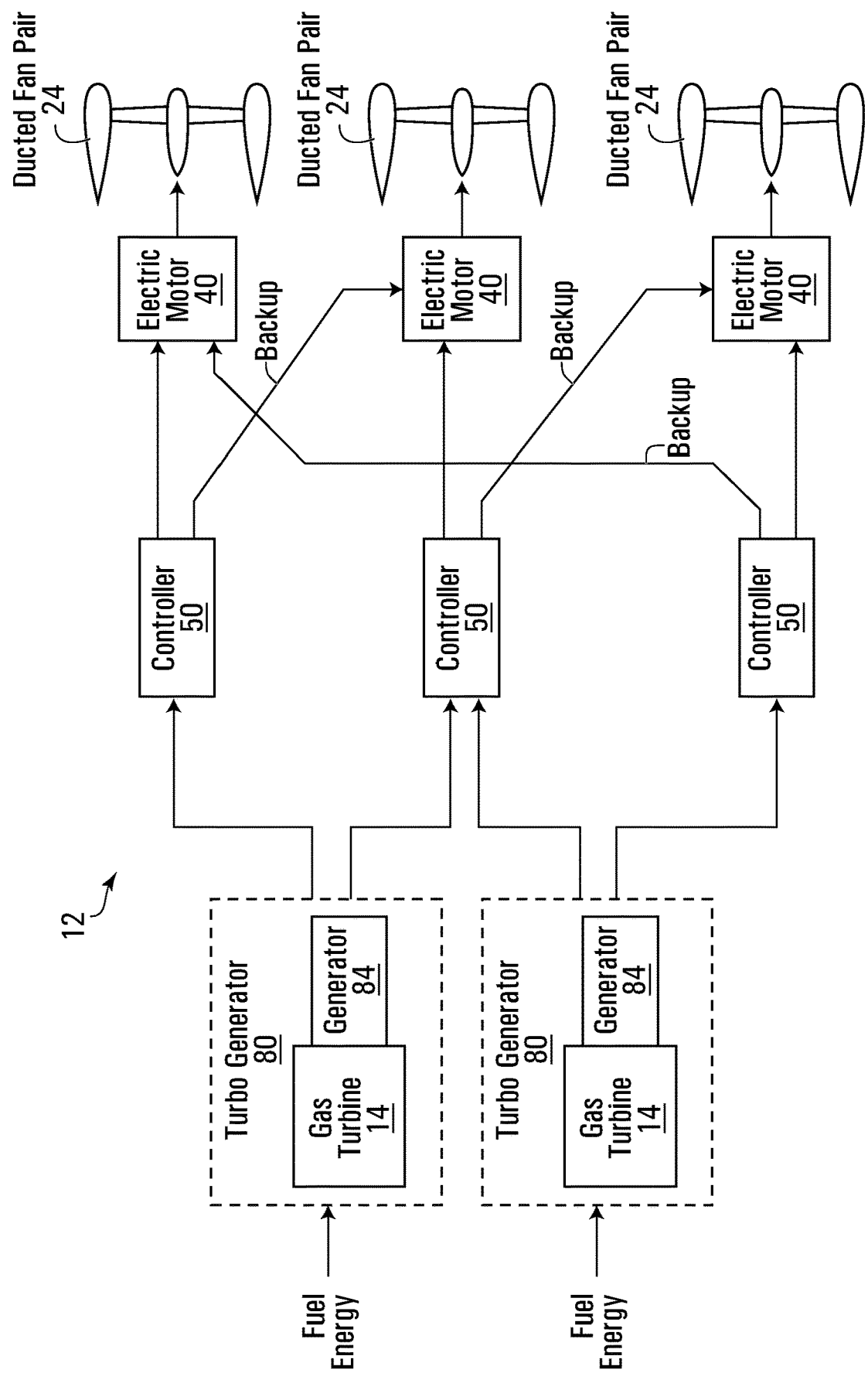
FIG. 8 is a schematic diagram of another operating environment of a system for varying excess thrust, in accordance with an embodiment.
Figure 9:
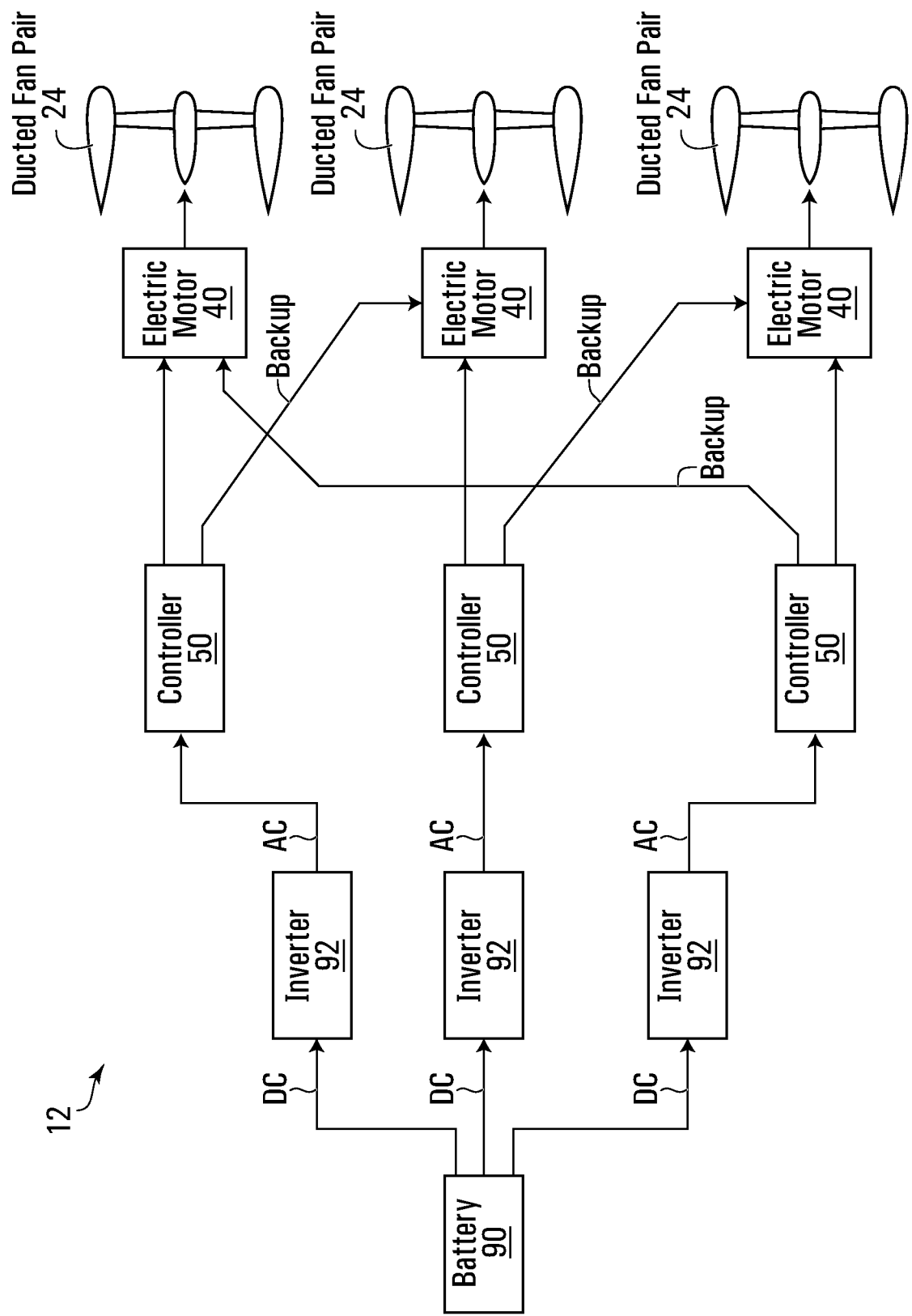
FIG. 9 is a schematic diagram of a further operating environment of a system for varying excess thrust, in accordance with an embodiment.

Turning now to FIGS. 7 to 9, various operating environments of system 12 are illustrated with various power sources. It will be appreciated that any one or more of the following power sources can be combined to provide power and control for system 12, and can be controlled by a centralized controller such as excess thrust controller 60 (not shown), for example, in communication with at least the power source and each controller 50.

FIG. 7 is a schematic diagram of an operating environment of a turbo generator 70, such as APU 11, feeding power to system 12, in accordance with an embodiment.

In the embodiment illustrated in FIG. 7, a power source for system 12 can be a turbo generator 70, for example, an auxiliary power unit such as APU 11, including a gas turbine engine 72 supplied with fuel energy and an electric generator 74, or other suitable engine and electric generator. Thus, electric motor 40 is driven by electric energy from an electric generator of an auxiliary power unit such as APU 11.

In some embodiments, generator 74 is an electric generator used to generate electricity. Generator 74 can be oil-cooled and include a gearbox for transferring power from a shaft of a gas turbine engine such as an APU to electric power.

In some embodiments, generator 74 is a synchronous AC generator (sometimes referred to as an "alternator"), such as a permanent magnet generator.

In some embodiments, generator 74 can have a power rating of 120 kVA. In some embodiments, generator 74 generates AC current, for example, a three-phase, 400 Hz, 115 or 120 phase voltage output.

As shown in FIG. 7, electrical energy generated from turbo generator 70 is supplied to controllers 50, and controllers 50 supply power and control operation for each electric motor 40. Each electric motor 40 is rotatably coupled to a ducted fan pair of fans 24. Each controller 50 can control an electric motor 40, and serve as a backup to one or more other electric motors 40 such that if a controller 50 to an electric motor 40 fails, a backup controller 50 operates to control and supply power to that electric motor 40.

One or more controllers 50 in a configuration can be the same or different and control any one or more of electric motors 40.

In use, fuel energy, in an example 18,550 BTU/lb or 11.98 kWh/kg of fuel energy, is supplied to turbo generator 70.

Turbo generator 70 can operate, in an example, at approximately 28-48% efficiency, whereby efficiency is defined as useful energy output divided by energy input. Gas turbine engine 72 can operate, in an example, at approximately 30-50% efficiency. Generator 74 can operate, in an example, at approximately 95% efficiency.

Electric motors 40 can operate, in an example, at approximately 95% efficiency. Each pair of fans 24 can operate, in an example, at approximately 80% efficiency.

In an example, system 12 can be powered by turbo generator 70 and draw approximately 500 kW from turbo generator 70 in a climb mode or an Automatic Power Reserve (APR) mode to provide thrust in the event of an engine thrust loss during takeoff and missed approach conditions.

FIG. 8 is a schematic diagram of another operating environment of system 12, in accordance with an embodiment.

In the embodiment illustrated in FIG. 8, a power source for system 12 can be turbo generators 80, including gas turbine engines 14 supplied with fuel energy and electric generators 84, or other suitable engine and electric generator. Electric motor 40 is thus driven by electric energy from an electric generator 84 of one or more engines 14 of aircraft 10.

In some embodiments, generator 84 can be similar to generator 74, including structure and components.

As shown in FIG. 8, electrical energy generated from turbo generators 80 is supplied to controllers 50, and controllers 50 supply power and control operation of each electric motor 40. Each electric motor 40 is rotatably coupled to a ducted fan pair of fans 24. Each controller 50 can control an electric motor 40, and serve as a backup to another electric motor 40 such that if a controller 50 to an electric motor 40 fails, a backup controller 50 operates to control and supply power to that electric motor 40.

One or more controllers 50 can be the same or different and control any one or more of electric motors 40.

In use, fuel energy, in an example 18,550 BTU/lb or 11.98 kWh/kg of fuel energy, is supplied to each turbo generator 80.

Turbo generator 80 can operate, in an example, at approximately 28-48% efficiency, defined as useful energy output divided by energy input. Engine 14 can operate, in an example, at approximately 30-50% efficiency. Generator 84 can operate, in an example, at approximately 95% efficiency.

Electric motors 40 can operate, in an example, at approximately 95% efficiency. Each pair of fans 24 can operate, in an example, at approximately 80% efficiency.

In an example, system 12 can be powered by turbo generator 80 and draw approximately 40 to 50 kW in a cruise mode.

FIG. 9 is a schematic diagram of a further operating environment of a system 12, in accordance with an embodiment.

In the embodiment illustrated in FIG. 9, a power source for system 12 can be a battery 90. Thus, electric motor 40 can be driven by electric energy supplied by battery 90. In some embodiments, the power source includes multiple batteries 90, for example, configured as a battery pack.

In some embodiments, battery 90 can have a specific energy density of as high as 0.5 kWh/kg. In other embodiments, battery 90 can have a specific energy density of approximately 0.2 kWh/kg, in another example 0.25 kWh/kg.

Battery 90, a plurality of batteries 90, or a battery pack formed from batteries 90 can supply DC current to an inverter 92 or multiple inverters 92.

Inverter 92 can be a suitable device or circuitry to change direct current (DC) to alternating current (AC).

In use, inverters 92 can operate at approximately 98% efficiency, and electric motors 40 can operate, in an example, at approximately 95% efficiency. Each pair of fans 24 can operate, in an example, at approximately 80% efficiency.

As shown in FIG. 9, electrical energy generated from battery 90 is supplied to controllers 50, and controllers 50 supply power and control operation of each electric motor 40. Each electric motor 40 is rotatably coupled to a ducted fan pair of fans 24. Each controller 50 can control an electric motor 40, and serve as a backup to another electric motor 40 such that if a controller 50 to an electric motor 40 fails, a backup controller 50 operates to control and supply power to that electric motor 40.

One or more controllers 50 can be the same or different and control any one or more of electric motors 40.

In some embodiments, electric motors 40 can be used in reverse function as generators to convert mechanical energy into electrical energy. Regenerative braking can be performed by transferring mechanical energy from the propulsion of aircraft 10 to an electrical load.

One or more batteries 90 can be used to power system 12 to generate thrust, and can also operate in a regeneration mode to capture airflow, rotate electric motor 40 and feed electrical energy back to controllers 50 and inverters 92 and to batteries 90. Electric motor 40 can be operable as a generator to convert mechanical energy into electric energy to supply to one or more batteries 90. Thus, in a battery configuration, system 12 is a fully reversible system.

In an example, system 12 can capture energy during descent of aircraft 10, which can be used to power electric systems, such as electric brakes on landing, should engine driven generators fail, or if power is needed to feed systems in specialized mission airplanes.

In some embodiments, in use, system 12 can produce approximately 1,500 lbs excess thrust (thrust minus drag) at 110 KCAS (knots calibrated airspeed), near VMCG (velocity of minimum control on ground) speed.

Figure 10:
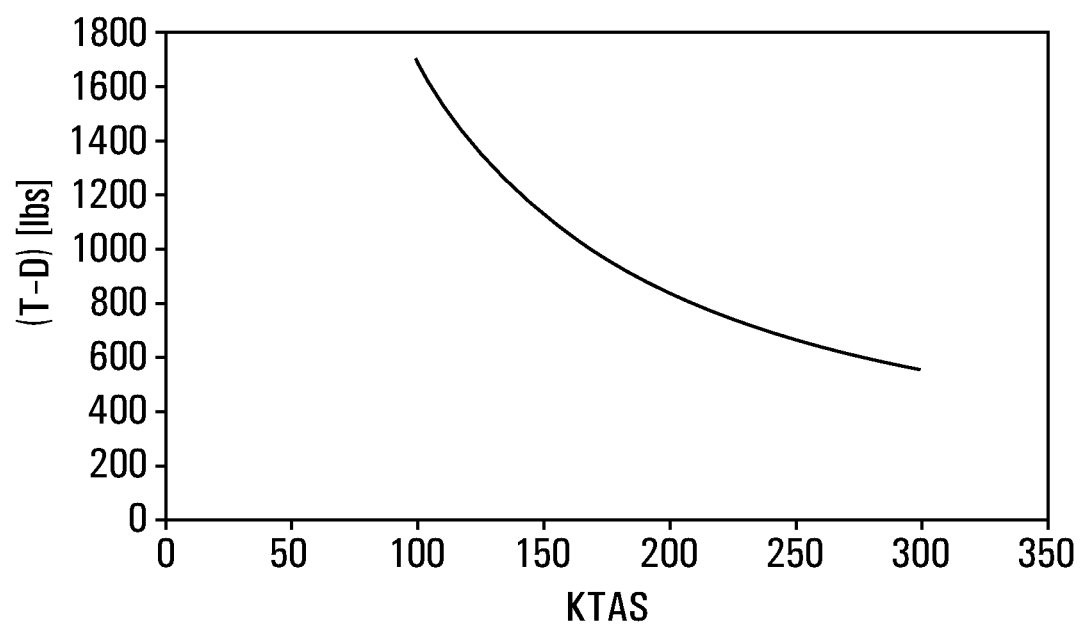
FIG. 10 is a graph illustrating a relationship between excess thrust and airspeed generated by an aircraft, in accordance with an embodiment.

FIG. 10 is a graph illustrating a relationship between, on the y-axis, excess thrust (thrust minus drag) in lbs (pounds) of aircraft 10, including thrust generated by system 12, and on the x-axis airspeed in KTAS (knots true airspeed).

Assuming a propulsion efficiency, and based on a power input, excess thrust can be determined by multiplying input power by efficiency, and dividing by airspeed, to generate the graph of FIG. 10. Excess thrust multiplied by airspeed results in propulsive power.

Excess thrust generated by system 12, in an embodiment, can approximate the thrust deficit between a larger engine (for example, rated for up to 12,600 lbs static takeoff thrust) and a smaller and lighter engine (for example, rated for up to 7,700 lbs static takeoff thrust) at the critical engine failure speed.

System 12 can be driven by approximately 650 SHP from a power source such as an APU. System 12 can be powered by an appropriate power source, such as APU 11 or engines 14, at least in part based on the amount of excess thrust needed.

System 12 can be configured for use in a variety of modes of operation of aircraft 10, including pushback at gate, for example, using a thrust reverser (TR) throttle lever as pilot input; taxiing, for example, using a tiller with throttle-type input; during takeoff, to provide drag control and replace an Automatic Power Reserve (APR) by providing centerline thrust; during climb and cruise, for example, improving excess thrust (for example, using an auto setting by way of excess thrust controller 60 to adjust thrust generated by system 12 to minimize energy consumption) and can be fed by main engines 14 if an APU is not required; flight path control, for example, using a speedbrake level to increase drag without multi-function spoilers (MFS) and can allow for rapid thrust direction change; as a ram air turbine (RAT)

replacement that can provide backup electrical to aircraft systems; and regeneration, storing energy in batteries such as batteries 90, if needed.

System 12 can be configured for reduced VMCG (Velocity, Minimum Control (ground)). VMCG is the minimum speed, while on the ground, that directional control can be maintained using aerodynamic controls, with one engine inoperative. Thus, VMCG is proportional to asymmetric thrust (when one engine fails), and rudder deflection applied to counter the asymmetric thrust.

Use of system 12, by generating thrust to counter the asymmetric thrust, can allow for a reduced VMCG with smaller fuselage mounted engines, such as engines 14. Similarly, system 12 can allow for a reduced VMCA (Velocity, Minimum Control (air)).

In various operating modes of aircraft 10, system 12 can source power from power sources such as those described herein.

For example, when aircraft 10 is taxiing, which can be propelled by system 12, system 12 can draw power from APU 11.

System 12 can be configured to generate forward takeoff thrust to supplement thrust generated by engines 14 (for example, a first engine and a second engine) during takeoff of aircraft 10.

To generate additional forward thrust for takeoff or as aircraft 10 climbs or a go around, system 12 can draw power from APU 11, which can be required to supplement thrust generated by engines 14 and reduce drag. For example, use of a smaller engine 14 can require thrust generated by system 12 at takeoff.

In a climb mode, system 12 can be powered by APU 11 and configured to draw approximately 500 kW from a power source, for example, generator 74 as shown in FIG. 7 and described above, resulting in an energy drag of approximately 500 kW to feed system 12.

System 12 can be configured to configured to generate forward cruise thrust to supplement thrust generated by engines 14 (for example, a first engine and a second engine) during cruise of aircraft 10.

In a cruise mode, system 12 can be configured to draw approximately 40 to 50 kW from a power source, for example, electrical generators 84 powered by engines 14, as shown in FIG. 8 and described above. Thus, approximately 40-50 kW of energy can be required to accelerate mass flow from the boundary layer back to true airspeed, thus reducing fuselage pressure drag.

In cruise, system 12 can be fed by main engines 14 primarily to provide control of drag, as APU 11 can be shut down during cruise which can improve fuel burn.

During cruise mode, it can be desirable to minimize fuel burn by reducing drag, as sufficient thrust can be generated by engines 14. System 12 can minimize energy use by aircraft as compared to distance travelled, whereby energy use is defined as the sum of all sources of fuel burn. An increase in thrust and reduction of drag by system 12 can be modified to minimize fuel burn.

In some embodiments, excess thrust controller 60 can manage the sources of power from aircraft 10 to system 12 to minimize fuel burn.

In some embodiments, excess thrust controller 60 can monitor fuel burn in real-time to optimize it, in particular, by minimizing the sum of fuel burn, for example, to engines 14 and APU 11.

During a landing or descent, system 12 can generate reverse thrust and additional drag to descend aircraft 10.

System 12 can create drag and descend without using engines and deploying speed brakes.

In some embodiments, batteries 90 can capture energy in descent and reduce overall fuel burn in aircraft 10, and batteries 90 can also power electrical brakes for landing.

In a regeneration mode, system 12 can be operated to generate electrical energy, for example, stored in batteries 90.

In some embodiments, fans 24 can be configured to be rotated by a flow such as forward flow 402 or reverse flow 404, to capture energy.

Fans 24 can be connected to a generator, for example, electric motors 40 operating as generators, to generate electrical energy, and the electrical energy can be used in a battery pack configuration such as batteries 90 as shown in FIG. 9, or supplied to a suitable system.

Thus, fans 24 can be used as ram air turbines as required by an energy system and operate as a small wind turbine connected to a hydraulic pump, or electrical generator, of aircraft 10.

In an example, system 12 could generate electricity in an instance of a lost engine 14, or could be used to provide all electricity for a special mission.

In another example, in use, certain fans 24 of system 12 can generate thrust while certain other fans 24 can generate electrical energy. For example, system 12 can include six fans 24. Four of the six fans 24 can produce forward thrust, and two of the fans act as generators, such as in a failure mode.

System 12 can be configured to provide standby power for aircraft 10. In some embodiments, system 12 is powered on at brake release. Then, if there is a failure of one of engines 14, system 12 activates to provide automatic performance reserve (APR) (or boost) to generate additional thrust.

Figure 11:
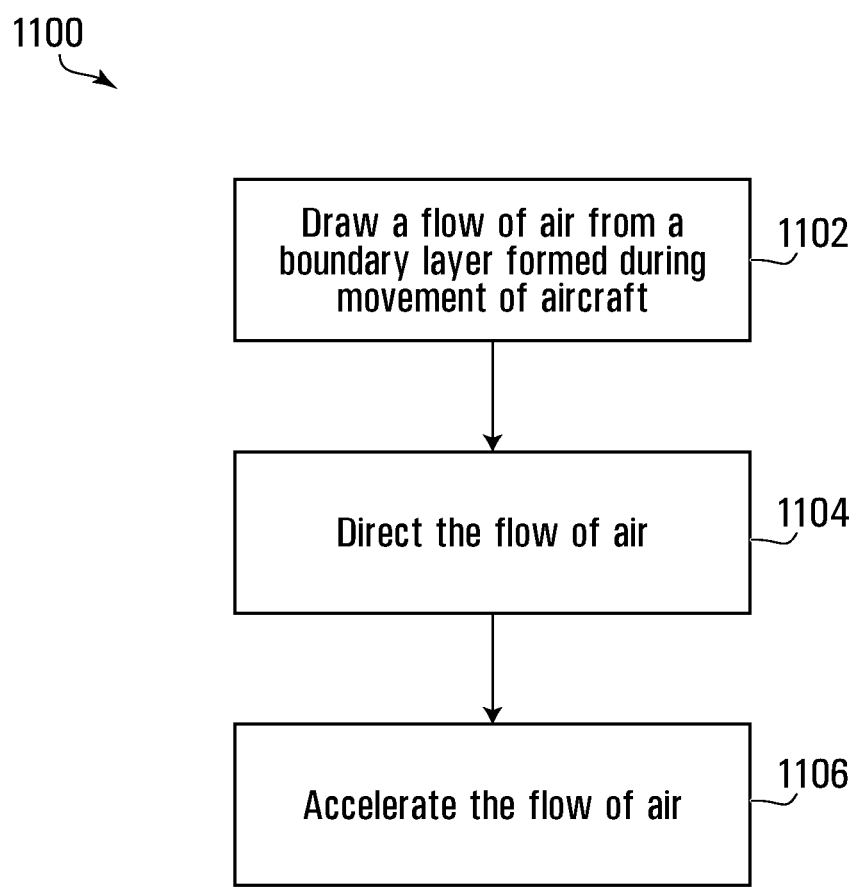
FIG. 11 is a flowchart of a method for controlling excess thrust in an aircraft, in accordance with an embodiment.

FIG. 11 is a flowchart of a method for controlling thrust and drag of aircraft 10, according to an embodiment, which can be performed by fans 24 of system 12 to generate forward or reverse thrust, or to increase or decrease drag. The steps are provided for illustrative purposes. Variations of the steps, omission or substitution of various steps, or additional steps can be considered.

At block 1102, a flow of air, for example, forward flow 402 or reverse flow 404, is drawn, for example, from a boundary layer formed during movement of aircraft 10.

At block 1104, the flow of air can be directed or re-energized by flow channel 22 to minimize turbulence.

At block 1106, the flow of air can be accelerated, for example, by rotating fan 24 in a first direction to impel the flow of air towards the rear of aircraft 10 to generate forward thrust, or rotating fan 24 in a second direction to impel the flow of air towards the front of aircraft 10 to generate reverse thrust.

It should be understood that one or more of the blocks can be performed in a different sequence or in an interleaved or iterative manner.

In some embodiments, fans 24 of system 12 are disposed on aircraft 10 such that fans 24 can intake air from within a boundary layer formed by the movement of aircraft 10. In some embodiments, fans 24 are disposed on aircraft 10 such that the only air flow that is intaken by system 12 is boundary layer air, and do not extend radially out past the boundary layer to intake clean air. Thus, in some embodiments, system 12 only ingests boundary layer air.

In some embodiments, one or more fans 24 are fully disposed within a distance from the surface of the aircraft that is less than a boundary layer thickness formed from the surface of aircraft 10 during take-off and cruising of the aircraft, the boundary layer thickness can be defined as a distance from the surface to a point at which a velocity of a local flow is ninety-nine percent of a velocity of a surrounding freestream flow.

Boundary layer ingestion can be used by system 12 to decrease the propulsive power consumption of an aircraft, and therefore the fuel consumption, by producing thrust from the reduced velocity boundary layer air.

Conveniently, system 12 can provide approximately 3 to 5% fuel burn reduction by ingesting boundary layer air instead of clear air flow.

A key challenge associated with boundary layer ingesting systems is the ability of the turbomachinery to operate efficiently in highly distorted flow.

Fans 24 of system 12 can be disposed being completely in boundary layer at particular operating parameters. Thus, intake flow (turbulent flow) can be slower, and can blades of fans 24 can be thicker, because fans 24 do not have to deal with fast flow (of laminar flow), to cater to pressure fluctuation, and blade stresses can be addressed by having thicker blades.

Figure 12:
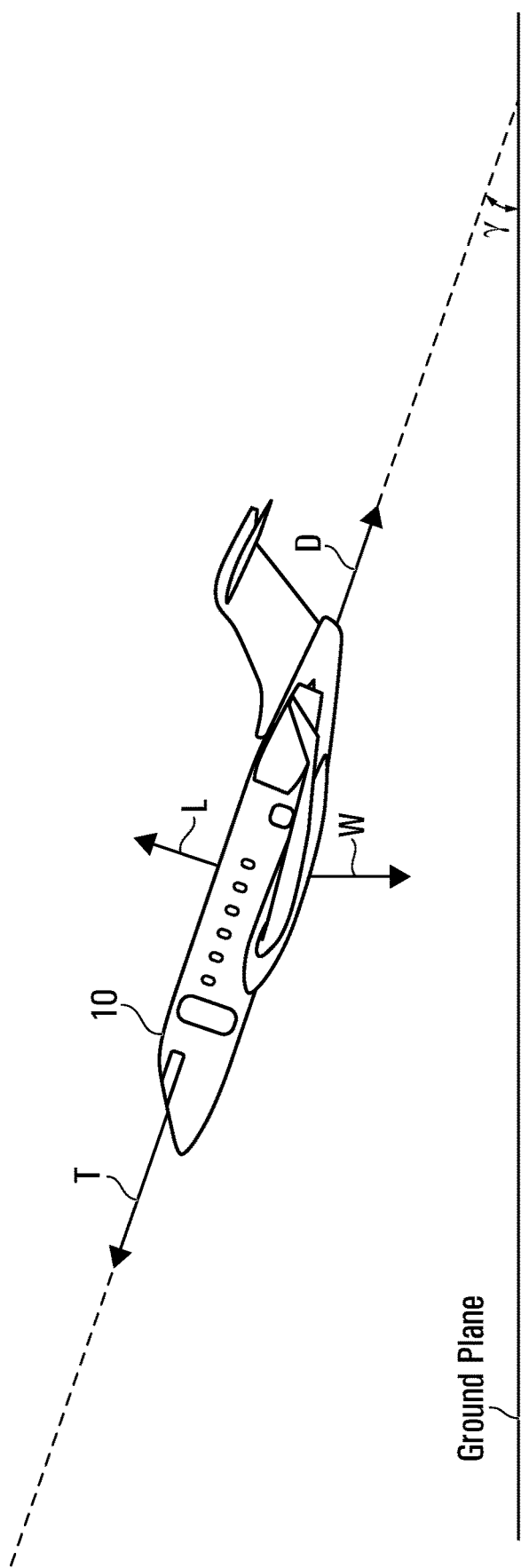
FIG. 12 is a schematic diagram illustrating forces acting on an aircraft in flight, in accordance with an embodiment.

FIG. 12 is a schematic diagram illustrating forces acting on aircraft 10 in flight: lift L, weight W, thrust T, and drag D, and a climb angle γ defined as the angle between a Horizontal Plane representing the earth's surface and the actual flight path followed by the aircraft 10.

The forces of flight can be defined as follows:

$$W \sin(\gamma) = T - D \quad (1)$$

where W is weight of aircraft 10, γ is climb angle, T is thrust and D is drag.

Equation (1) can be rearranged as:

$$\sin(\gamma) = \frac{T - D}{W} \quad (2)$$

Thus, $$\gamma \propto \frac{T - D}{W} \quad (3)$$

Thrust T and drag D are vector quantities, thus having a magnitude and direction associated with them. The net external force on aircraft 10 can be referred to as "excess thrust" and can be defined as thrust T minus drag D, and is thus also a vector quantity. System 12 can be configured to control and vary excess thrust, for example, by adding forward thrust or reverse thrust and increasing or decreasing drag, and thus control flight path of aircraft 10. By determining a desired flight path angle or acceleration, based on input such as pilot input, autopilot input and various sensor feedback, a determined amount of energy can be sent to system 12.

Thrust T can thus be modified by system 12 to provide forward or reverse thrust during takeoff and other situations using techniques as described herein.

Conveniently, system 12 can replace thrust reversers on an engine such as one or more of engines 14 and improve fuel burn on those engines, provide less leakage, less weight, and less cost.

System 12 can also be configured to modify (increase or decrease) drag D using techniques as described herein.

In some configurations, system 12 can allow for use of a smaller and lighter engine, which can be less costly. Specific fuel consumption (SFC) of a smaller engine in combination with an embodiment of system 12 can be similar or improved as compared to a de-rated larger engine.

Use of system 12 can allow for a lighter aircraft 10 with a lower operating empty weight (OEW), in an example, reduced by 6000 lbs and thus reduced cost.

Based on simulated sample missions, similar fuel consumption results from both a smaller engine in combination with an embodiment of system 12 and a de-rated larger engine, as well as similar range, and aerodynamics was not necessarily optimized.

In another configuration, system 12 can replace a thrust reverser on a traditional engine. Based on simulated sample missions, replacement with system 12 can be weight and cost neutral, with a small range increase (approximately 1%) at max payload, and approximately 1.5% fuel burn reduction on 600 nm.

Some configurations of removal of thrust reversers from a traditional engine and inclusion of system 12 can result in a weight and cost reduction, for example, a reduction in basic weight (BOW) of approximately 3.5%.

System 12 can also provide a range increase (approximately >17%) at max payload, and approximately >12% fuel burn reduction for 600 nm, an initial climb altitude (ICA) increase for max range, a full payload at full fuel, negligible impact on weight at takeoff (WAT) limit, small impact on takeoff distance (with the same range-payload), and VMCG/VMCA reduction (for short field operation (SFO)).

Thus, there is a possibility of fleet cost savings with system 12.

Structurally, in some embodiments, system 12 does not provide wing aerodynamics changes, however, an aircraft's tail tank could be removed, providing further weight and cost savings, and still have increased range.

Conveniently, system 12 can provide improved range, reduced fuel burn (reduced fuel consumption), as well as improved product perception (in the form of a hybrid-electric airplane).

System 12 can allow for the possibility of an aircraft taxiing with engines off, backing out of terminal gates, and climb and cruise drag reduction.

System 12 can provide inflight thrust-reversers (flight path control, including steep approach without multi-function spoiler (MFS), and improved emergency descent), as well as on-ground thrust-reversers (with improved stopping capability).

Due to system 12 being able to provide reverse thrust, main engine thrust reverse can be removed from the main engines. The removal of main engine thrust reversers can provide a weight and cost savings, and in an example, about 0.5% SFC (specific fuel consumption) improvement for the engine.

System 12 can also provide improved VMCA/VMCG. The management of excess thrust along an aircraft centerline, resulting in a smaller vertical tail and reduced weight and cost.

System 12 can improve short field performance and wet/contaminated field performance.

System 12 can also be configured to act as a Ram Air Turbine (RAT), and a conventional RAT can be removed.

System 12 can also provide regenerative capability, for example, to batteries or electrical systems.

A system 12 can be sized to produce the equivalent of the missing takeoff thrust of under one engine inoperative (OEI) takeoff and go-around of the engine being replaced, and can officially not be required from a thrust point of view for other phases of flight.

On typical missions (500 nm and 1000 nm) for an aircraft, integrating system 12 has the potential to reduce fuel burn by over 10%. In an example, on a 1000 nm mission, there is the potential to reduce fuel burn by 852 lbs of fuel (over one ton of $CO_2$).

Systems and methods described herein can be utilized in additional applications, such as integrating a powerplant into an airframe and reducing pitching moment from engine thrust change to increase fuel efficiency and possibly remove the horizontal tail, resulting in a weight and cost reduction.

Other applications include boosting initial climb altitude (ICA) to try to increase flight altitude, for example, to achieve 41,000 ft.

In other applications, through a power management computer, an embodiment of system 12 can be adjusted in cruise to minimize fuel burn when at altitude, including shutting down an APU.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A system for varying excess thrust of an aircraft, comprising:
   a first electric fan rotatable about a first axis for directing a first air flow along a first air flow path;
   a second electric fan rotatable about a second axis different from the first axis for directing a second air flow along a second air flow path fluidly isolated from the first air flow path; and
   first and second air intakes in fluid communication with an auxiliary power unit to direct air to the auxiliary power unit,
   wherein:
      the first electric fan and the second electric fan are disposed radially about a roll axis of the aircraft and adjacent an aft end of the aircraft;
      the first electric fan and the second electric fan are disposed in a cavity in a tail cone within the aircraft;
      the first electric fan and the second electric fan are configured to intake boundary layer air to form the first air flow and the second air flow; and
      the first and second air intakes for the auxiliary power unit are also disposed in the cavity in the tail cone within the aircraft with the first and second electric fans disposed radially about the roll axis of the aircraft.

2. The system of claim 1, wherein the first electric fan and the second electric fan are coplanar in a single plane that is parallel to a transverse plane containing a pitch axis of the aircraft and a yaw axis of the aircraft.

3. The system of claim 1, wherein the first electric fan and the second electric fan are bilaterally symmetrical in a plane of symmetry containing the roll axis of the aircraft and a yaw axis of the aircraft.

4. The system of claim 1, further comprising fairing channels, a first one of the fairing channels surrounding the first electric fan to direct air towards the first air flow path and a second one of the fairing channels surrounding the second electric fan to direct air towards the second air flow path.

5. The system of claim 1, wherein the first electric fan and the second electric fan are driven by respective electric motors.

6. The system of claim 5, wherein the electric motors are driven by electric energy from an electric generator of the auxiliary power unit.

7. The system of claim 5, wherein the electric motors are driven by electric energy supplied by a battery.

8. The system of claim 7, wherein the electric motors are operable as generators to convert mechanical energy into electric energy to supply to the battery.

9. The system of claim 5, wherein the electric motors are driven by electric energy from an electric generator of one or more engines of the aircraft.

10. The system of claim 5, further comprising one or more controllers to control the electric motors.

11. The system of claim 1, wherein the first electric fan and the second electric fan are ducted fans.

12. The system of claim 1, wherein the first axis and the second axis are parallel to the roll axis of the aircraft.

13. The system of claim 1, wherein the first electric fan and the second electric fan are fully disposed within a distance from a surface of the aircraft that is less than a boundary layer thickness formed from the surface of the aircraft during take-off and cruising of the aircraft, the boundary layer thickness being a distance from the surface to a point at which a velocity of a local flow is ninety-nine percent of a velocity of a surrounding freestream flow.

14. The system of claim 1, further comprising:
   a first gate actuable between a closed position, to direct a forward flow of the first air flow in the first air flow path from a forward end of the aircraft to the aft end of the aircraft, and an open position, to direct a reverse flow of the first air flow in the first air flow path from the aft end of the aircraft to the forward end of the aircraft; and
   a second gate actuable between a closed position, to direct a forward flow of the second air flow in the second air flow path from a second end of the aircraft to the aft end of the aircraft, and an open position, to direct a reverse flow of the second air flow in the second air flow path from the aft end of the aircraft to the forward end of the aircraft.

15. The system of claim 1, further comprising:
   a third electric fan rotatable about a third axis for directing a third air flow along a third air flow path;
   a fourth electric fan rotatable about a fourth axis for directing a fourth air flow along a fourth air flow path;
   a fifth electric fan rotatable about a fifth axis for directing a fifth air flow along a fifth air flow path; and
   a sixth electric fan rotatable about a sixth axis for directing a sixth air flow along a sixth air flow path,
   wherein the third electric fan, the fourth electric fan, the fifth electric fan, and the sixth electric fan are disposed radially about the roll axis of the aircraft and adjacent the aft end of the aircraft and configured to intake boundary layer air to form the third air flow, the fourth air flow, the fifth air flow and the sixth air flow,
   each of the first axis, the second axis, the third axis, the fourth axis, the fifth axis, and the sixth axis are different from each other, and
   each of the first air flow path, the second air flow path, the third air flow path, the fourth air flow path, the fifth air flow path, and the sixth air flow path are fluidly isolated from each other.

16. An aircraft comprising a first engine, a second engine and the system of claim 1.

17. The aircraft of claim 16, wherein the system is configured to generate forward takeoff thrust to supplement thrust generated by the first engine and the second engine during takeoff of the aircraft.

18. The aircraft of claim 16, wherein the system is configured to generate forward cruise thrust to supplement thrust generated by the first engine and the second engine during cruise of the aircraft.

\* \* \* \* \*